(12) United States Patent
Ogawa et al.

(10) Patent No.: US 10,739,231 B2
(45) Date of Patent: Aug. 11, 2020

(54) DATA MEASURING DEVICE SWITCHING COMMUNICATION DESTINATION FOR MEASURING PHYSICAL DATA

(71) Applicant: FANUC CORPORATION, Minamitsuru-gun, Yamanashi (JP)

(72) Inventors: Hajime Ogawa, Yamanashi (JP); Junichi Tezuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 259 days.

(21) Appl. No.: 15/058,700

(22) Filed: Mar. 2, 2016

(65) Prior Publication Data

US 2016/0258841 A1 Sep. 8, 2016

(30) Foreign Application Priority Data

Mar. 5, 2015 (JP) ................................ 2015-043406

(51) Int. Cl.
*H04L 12/403* (2006.01)
*G01M 13/02* (2019.01)
*H04L 12/46* (2006.01)

(52) U.S. Cl.
CPC ......... *G01M 13/02* (2013.01); *H04L 12/4035* (2013.01); *H04L 12/4604* (2013.01)

(58) Field of Classification Search
CPC . H04L 12/4035; H04L 12/4604; G01M 13/02
See application file for complete search history.

(56) References Cited

U.S. PATENT DOCUMENTS

| | | | | |
|---|---|---|---|---|
| 4,621,410 A | * | 11/1986 | Williamson | ......... B23Q 7/1426 29/563 |
| 4,788,481 A | * | 11/1988 | Niwa | ................. G05B 19/4069 318/565 |
| 6,708,385 B1 | * | 3/2004 | Lemelson | ................ B23Q 7/03 29/563 |
| 9,344,780 B2 | | 5/2016 | Nishikawa | |
| 9,651,939 B2 | | 5/2017 | Tezuka et al. | |

(Continued)

FOREIGN PATENT DOCUMENTS

| | | |
|---|---|---|
| CN | 103048950 A | 4/2013 |
| CN | 104184609 A | 12/2014 |

(Continued)

*Primary Examiner* — Michele Fan
(74) *Attorney, Agent, or Firm* — RatnerPrestia

(57) ABSTRACT

A data measuring device includes a communicating part capable of communicating with a plurality of numerical control devices which control a plurality of machine tools through communication cables, a physical data measuring part which measures physical data relating to operations of drive shafts of the machine tools corresponding to the numerical control devices which communicate with the communicating part through such numerical control devices, and a destination determining part which successively determines a numerical control device which should be the destination of the communicating part. The communicating part successively switches the destination so as to communicate with the numerical control device which should be the destination determined by the destination determining part, when the physical data measuring part measures the physical data.

2 Claims, 7 Drawing Sheets

(56) References Cited

U.S. PATENT DOCUMENTS

| | | | | |
|---|---|---|---|---|
| 2001/0034563 A1* | 10/2001 | Matsumoto | ...... | G05B 19/41865 700/101 |
| 2003/0216830 A1* | 11/2003 | Hasebe | ............ | G05B 19/4068 700/184 |
| 2003/0229414 A1* | 12/2003 | Nakazawa | ........... | G05B 19/408 700/175 |
| 2005/0228529 A1 | 10/2005 | Lev-Ami et al. | | |
| 2006/0149412 A1* | 7/2006 | Fujishima | .......... | G05B 19/4183 700/169 |
| 2008/0086220 A1* | 4/2008 | Ogawa | ............... | G05B 19/4069 700/15 |
| 2009/0204257 A1* | 8/2009 | Landsnes | ............... | B25J 9/1674 700/245 |
| 2011/0098979 A1* | 4/2011 | Yamada | ................ | G01D 21/00 702/189 |
| 2012/0257276 A1* | 10/2012 | Tezuka | ............... | B23Q 17/2409 359/464 |
| 2013/0054182 A1* | 2/2013 | Tezuka | ............... | G05B 19/4069 702/141 |
| 2013/0338816 A1* | 12/2013 | Tezuka | ................. | G05B 19/182 700/184 |
| 2015/0005924 A1* | 1/2015 | Matsubara | ......... | G05B 19/4093 700/192 |
| 2017/0031343 A1* | 2/2017 | Hatanaka | ................ | G05B 19/19 |
| 2017/0308057 A1* | 10/2017 | Kreidler | ............ | G05B 19/4069 |

FOREIGN PATENT DOCUMENTS

| | | | | | |
|---|---|---|---|---|---|
| DE | 4231317 | A1 | * | 4/1993 | ............. D01H 13/32 |
| EP | 0204020 | A1 | * | 12/1986 | ......... G05B 19/4202 |
| JP | 61274845 | A | * | 12/1986 | |
| JP | 01197807 | A | | 8/1989 | |
| JP | 04205324 | A | * | 7/1992 | |
| JP | 528281 | A | | 2/1993 | |
| JP | 578925 | A | | 3/1993 | |
| JP | 06091716 | A | * | 4/1994 | ............ B29C 45/76 |
| JP | 7116945 | A | | 5/1995 | |
| JP | 200066710 | A | | 3/2000 | |
| JP | 2000066710 | A | * | 3/2000 | ............... B21H 3/02 |
| JP | 2000-210800 | A | | 8/2000 | |
| JP | 2004-13665 | A | | 1/2004 | |

\* cited by examiner

FIG. 2A

| MEASUREMENT ORDER LIST | | | |
|---|---|---|---|
| LIST 1 | > | 1 | MACHINE M11 |
| LIST 2 | | 2 | MACHINE M12 |
| LIST 3 | | 3 | MACHINE M13 |
| | | 4 | MACHINE M14 |
| | | 5 | MACHINE M15 |

FIG. 2B

| MEASUREMENT ORDER LIST | | | |
|---|---|---|---|
| LIST 1 | | | |
| LIST 2 | > | 1 | MACHINE M21 |
| LIST 3 | | 2 | MACHINE M22 |
| | | 3 | MACHINE M23 |
| | | 4 | MACHINE M24 |
| | | 5 | MACHINE M25 |

FIG. 2C

| MEASUREMENT SCHEDULE | | | | |
|---|---|---|---|---|
| 15:00 | SCHEDULE 1 | > | 15:00 | MACHINE M11 |
| 16:00 | SCHEDULE 2 | | 15:10 | MACHINE M12 |
| 17:00 | SCHEDULE 3 | | 15:20 | MACHINE M13 |
| | | | 15:30 | MACHINE M14 |
| | | | 15:40 | MACHINE M15 |

FIG. 2D

| MEASUREMENT SCHEDULE | | | | |
|---|---|---|---|---|
| 15:00 | SCHEDULE 1 | | | |
| 16:00 | SCHEDULE 2 | > | 16:00 | MACHINE M21 |
| 17:00 | SCHEDULE 3 | | 16:10 | MACHINE M22 |
| | | | 16:20 | MACHINE M23 |
| | | | 16:30 | MACHINE M24 |
| | | | 16:40 | MACHINE M25 |

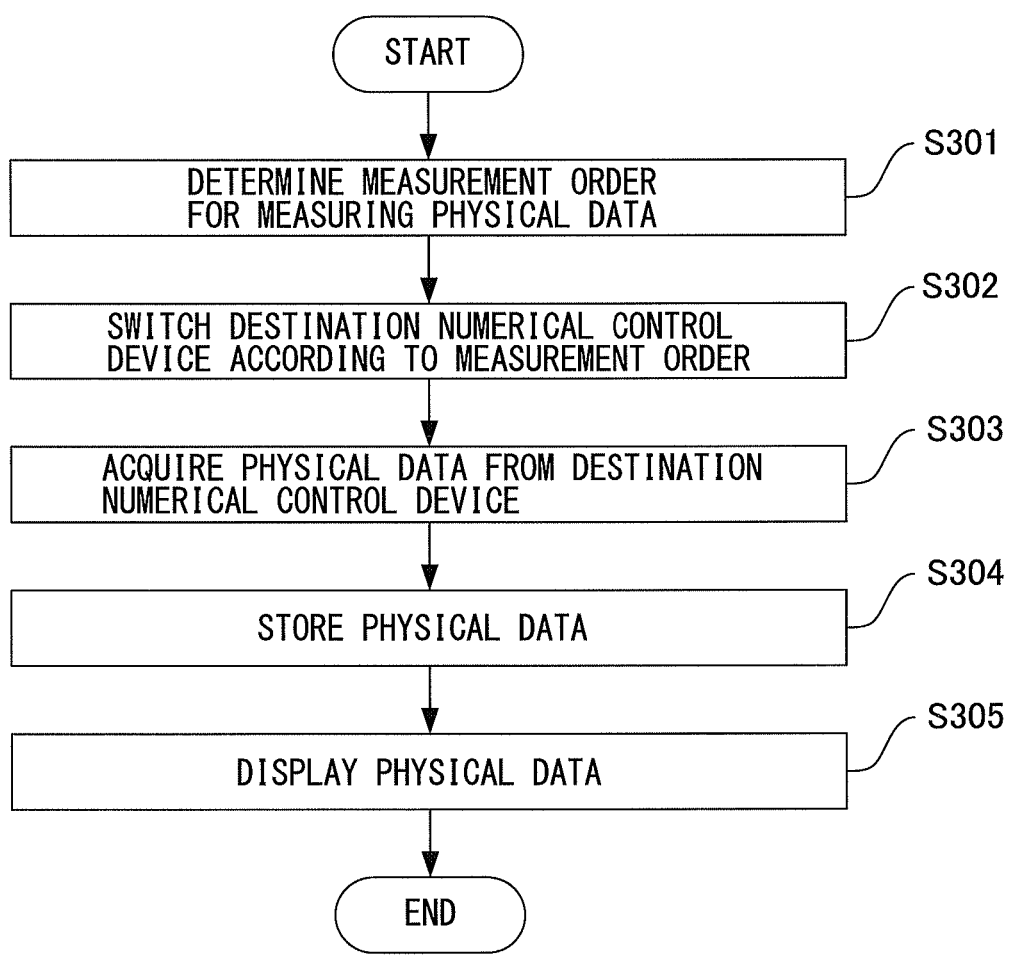

FIG. 7
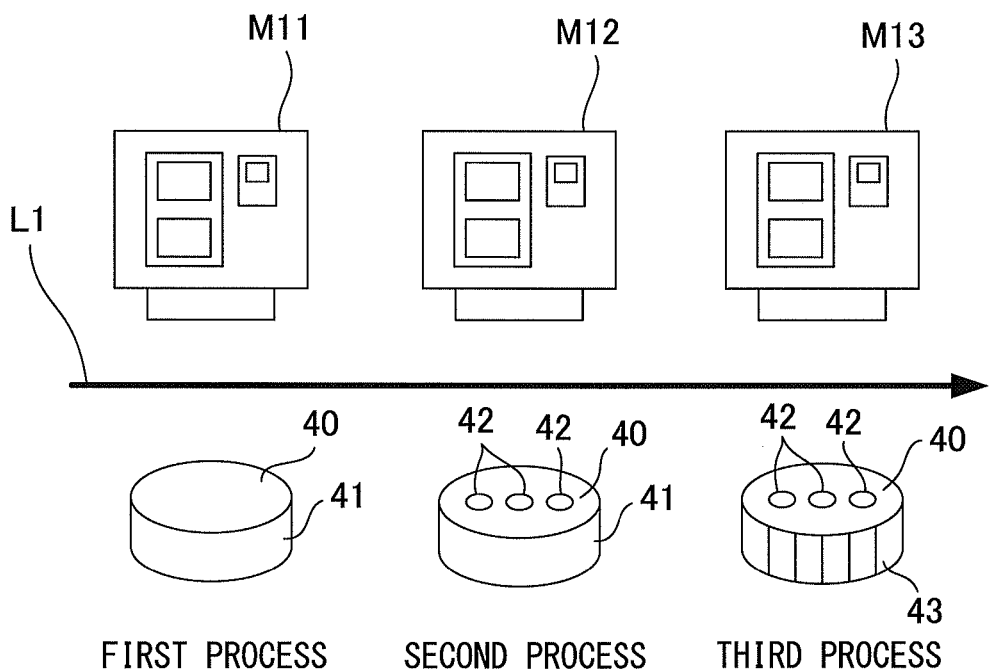
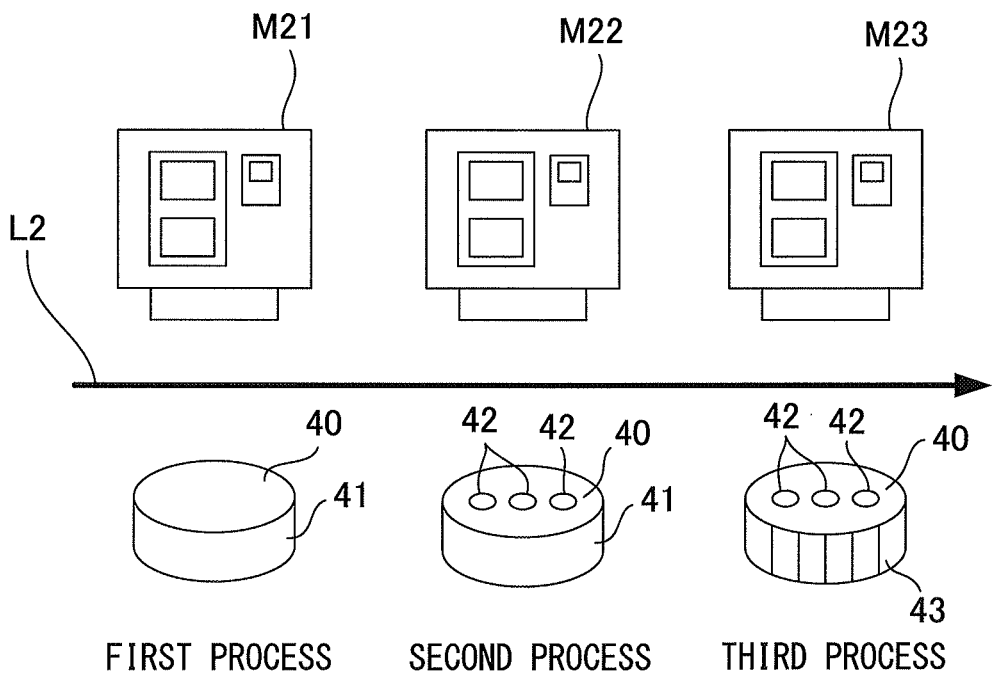

DATA MEASURING DEVICE SWITCHING COMMUNICATION DESTINATION FOR MEASURING PHYSICAL DATA

BACKGROUND OF THE INVENTION

1. Field of the Invention

The present invention relates to a data measuring device which measures data relating to operation of a machine tool.

2. Description of the Related Art

In a factory with a plurality of production lines, a host computer is used to collect operating data to monitor the operating states of the respective production lines. The collected operating data is data indicative of the operating states of various industrial machines such as machine tools or conveyor devices installed on the production lines. The operating data includes, for example, the number of production units, information on whether the respective machines are in operation, or whether there is any alarm notification resulting in shutdown, etc.

The operating data collected by a conventional host computer is generally transmitted from a number of industrial machines to the host computer simultaneously, since the sampling period is relatively long and the data amount is small. However, in recent years, there has been a need to measure not only such operating data, but also physical data relating to the operations of a drive shaft of a machine tool in real time. The physical data of a drive shaft may include, for example, the position or speed of the drive shaft. The physical data of a drive shaft is useful information for investigating the cause of machining defects of workpieces or for improving the machining precision.

However, physical data of a drive shaft utilized for the above-mentioned purpose has to be measured in short sampling periods. For this reason, in a production system in which a large number of machine tools simultaneously operate, a large amount of data is communicated in a short time, there is a risk of the communication line being insufficient in the processing capability, resulting in failure to collect data.

Japanese Patent Publication No. 2000-210800 discloses a monitor device for industrial machines, which is configured to store information indicative of the operating states of an industrial machine as continuous waveform data in time series and to transmit the stored waveform data to a diagnosis terminal via a network.

Japanese Patent Publication No. 2004-013665 discloses an operation management system which manages the operating states of machine tools, in which storage devices connected to NC devices one to one are used to store data relating to the operating states of the machine tools to transmit the stored data to a management device.

According to the related art described in Japanese Patent Publication Nos. 2000-210800 and 2004-013665, the measurement data from the machines to be measured is stored once and the stored data is transmitted to a monitor device or management device. Therefore, it is necessary to provide the machines with additional storage devices at the relay points of the network, etc. This requires an installation space, which in turn increases the size of the system and increases costs.

Therefore, there is a need for an inexpensive and compact data measuring device which can reliably measure physical data of a machine tool.

SUMMARY OF INVENTION

According to a first aspect of the invention of the present application, there is provided a data measuring device comprising: a communicating part capable of communicating with a plurality of numerical control devices configured to control a plurality of machine tools through telecommunications lines; a physical data measuring part configured to measure, through the numerical control devices in communication with the communication part, physical data relating to operations of respective drive shafts of the machine tools corresponding to the numerical control devices; and a destination determining part configured to successively determine at least one of the plurality of numerical control devices which should be the destination of the communicating part, wherein the communicating part is configured to successively switch the destination so as to communicate with the at least one numerical control device which should be the destination of the communicating part determined by the destination determining part when the physical data measuring part measures the physical data.

According to a second aspect of the invention of the present application, there is provided the data measuring device according to the first aspect, wherein the destination determining part is configured to determine at least one numerical control device which should be the destination of the communicating part in accordance with a predetermined order.

According to a third aspect of the invention of the present application, there is provided the data measuring device according to the first aspect, wherein the destination determining part is configured to determine at least one numerical control device which should be the destination of the communicating part in accordance with a predetermined time schedule.

According to a fourth aspect of the invention of the present application, there is provided the data measuring device according to the first aspect, wherein the destination determining part is configured to determine at least one numerical control device which should be the destination of the communicating part in response to a signal which is output from at least one of the plurality of numerical control devices.

According to a fifth aspect of the invention of the present application, there is provided the data measuring device according to any one of the first to fourth aspects, wherein the destination determining part is configured to determine at least one numerical control device which should be the destination of the communicating part, so that the physical data measuring part measures a set of physical data which is obtained by tracking machining processes with respect to a particular workpiece.

According to a sixth aspect of the invention of the present application, there is provided the data measuring device according to any one of the first to fourth aspects, wherein the plurality of machine tools are provided in a plurality of lines in which the same machining processes are performed with respect to a plurality of workpieces independently of each other, and wherein the destination determining part is configured to determine at least one numerical control device which should be the destination of the communicating part so that a set of physical data relating to the same machining processes which are performed in the plurality of lines can be obtained.

According to a seventh aspect of the invention of the present application, there is provided the data measuring device according to any one of the first to sixth aspects further comprises: a memory part configured to store the physical data measured by the physical data measuring part; and a display part configured to display the physical data stored by the memory part.

These and other objects, features and advantages of the present invention will become more apparent in light of the detailed description of exemplary embodiments thereof as illustrated in the drawings.

BRIEF DESCRIPTION OF THE DRAWINGS

FIG. 2A shows an exemplary interface for setting a measurement order.

FIG. 2B shows an exemplary interface for setting a measurement order.

FIG. 2C shows an exemplary interface for setting a measurement schedule.

FIG. 2D shows an exemplary interface for setting a measurement schedule.

FIG. 3 is a flowchart showing processes performed by a data measuring device according to one embodiment.

FIG. 7 shows machining processes performed in a plurality of production lines by way of example.

DETAILED DESCRIPTION

Embodiments of the present invention will be described with reference to the accompanying drawings. Constituent elements of the illustrated embodiments may be modified in size as necessary to facilitate understanding of the present invention. The same reference signs are used for the same or corresponding constituent elements.

Figure 1:
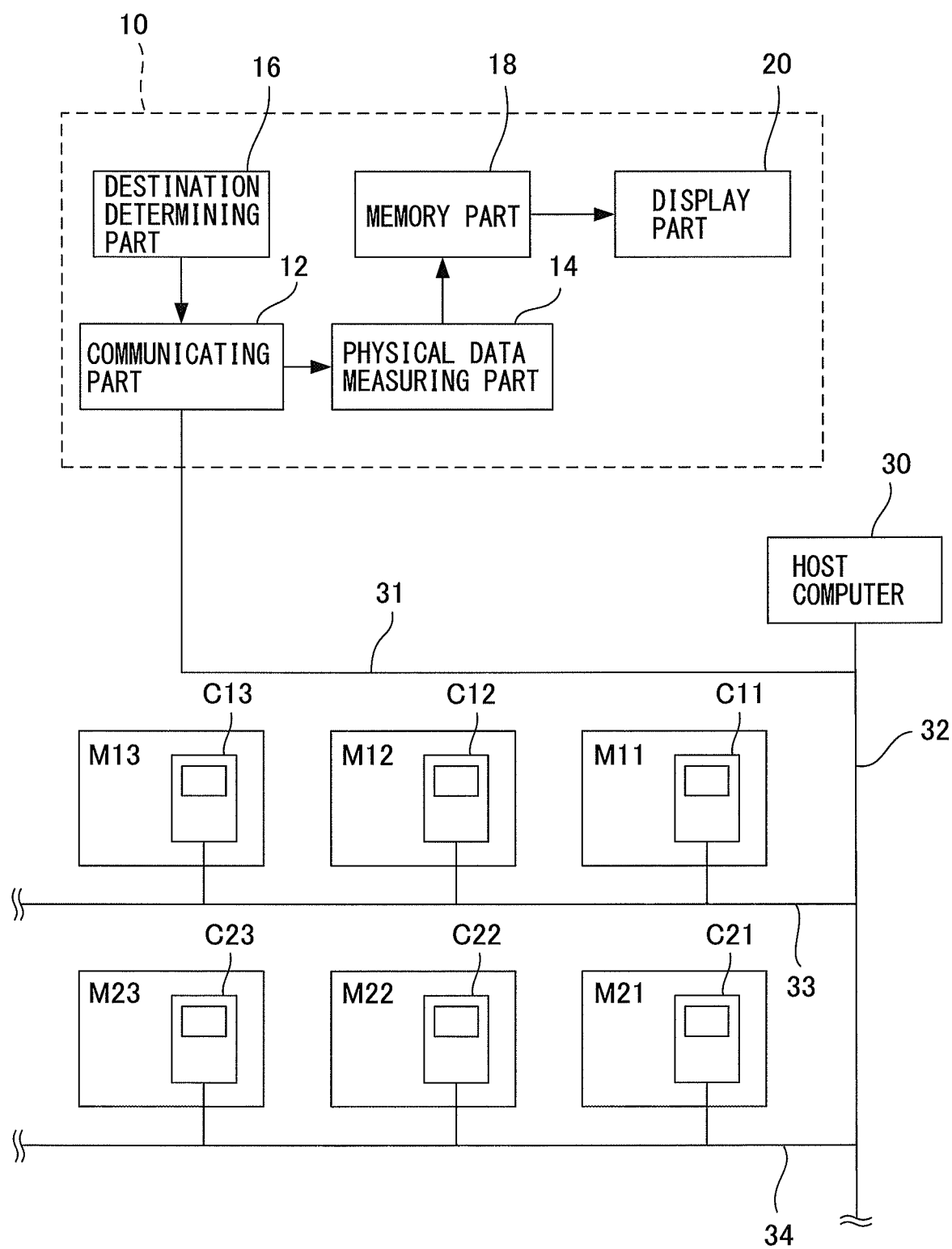
FIG. 1 is a functional block diagram of a data measuring device according to one embodiment.

FIG. 1 is a functional block diagram of a data measuring device according to one embodiment. A data measuring device 10 is connected by a communication cable 31 via a telecommunication line such as a LAN (local area network) to a host computer 30. The host computer 30 is further connected to a plurality of production lines through communication cables 32, 33, and 34. Each of the production lines is provided with a plurality of industrial machines, such as machine tools or conveyors.

Referring to FIG. 1, as the industrial machines in a first production line, some of the machine tools M11 to M13 are illustrated together with numerical control devices C11 to C13 which control the above machine tools M11 to M13. Also in a second production line, a plurality of industrial machines M21 to M23 are illustrated together with numerical control devices C21 to C23.

The host computer 30 is configured to acquire operating data indicative of the operating states of the respective production lines. For example, the host computer 30 is configured to acquire information on whether or not the machine tool M11 is in operation or to receive an alarm signal from a numerical control device when there is a fault in any of the machine tools.

The data measuring device 10 is used for measurement of physical data relating to the operations of the respective drive shafts of the machine tools M11 to M13, and M21 to M23 (hereinafter may be simply referred to as "the physical data") from the plurality of numerical control devices C11 to C13, and C21 to C23 connected to the data measuring device 10 via network. When the machine tool has a plurality of drive shafts, the data measuring device 10 is configured to measure the physical data with respect to each of the drive shafts. The "physical data" may include data relating to at least one of the position, speed, acceleration, torque, and the like of the drive shaft, but is not limited thereto.

The data measuring device 10 is a digital computer which is provided with a known hardware configuration including a CPU, ROM, RAM, non-volatile memory device, communication interface, input device such as a keyboard, and display device such as a liquid crystal display. The data measuring device 10 may be a device separate from the host computer 30 or may be built into the host computer 30.

As shown in FIG. 1, the data measuring device 10 is provided with a communicating part 12, physical data measuring part 14, destination determining part 16, memory part 18, and display part 20. As described below, the data measuring device 10 measures the physical data of a machine tool in real time by a short period such as a period of tens of microseconds to milliseconds. The data measuring device 10 may be configured, for example, so as to measure physical data in synchronization with the control period of a numerical control device for a machine tool.

The communicating part 12 is configured to communicate with a plurality of numerical control devices C11 to C13, and C21 to C23 through the communication cables 31, 32, 33, and 34. However, the communicating part 12 is, as described below, adapted to switch the communication destination as necessary so as to communicate with any of the numerical control devices. The destination may be switched, for example, by updating the IP address of the numerical control device to be designated as the destination.

The physical data measuring part 14 measures the physical data relating to the operations of the respective drive shafts of a corresponding machine tool through the numerical control device capable of communicating with the data measuring device 10 by the communicating part 12. The physical data measured by the physical data measuring part 14 is transmitted by a sampling period, such as a period of tens of microseconds or milliseconds, from the destination numerical control device to the data measuring device 10. The type of the physical data to be measured by the physical data measuring part 14 is selected by an operator. The drive shaft for which the physical data is measured may also be selected by an operator.

The destination determining part 16 successively determines the numerical control device to become the destination of the communicating part 12. The destination determining part 16 may be configured to determine only one numerical control device at a time as the destination of the communicating part 12, or may be configured to determine more than one numerical control devices at the same time as the destinations of the communicating part 12. The number of numerical control devices which can simultaneously communicate with the communicating part 12 depends on the capacity of the telecommunications line, the amount of data to be transferred, the processing capabilities of the host computer 30 and data measuring device 10, the sampling period, or the like.

The memory part 18 successively stores the physical data measured by the physical data measuring part 14 in the non-volatile memory of the data measuring device 10 or an external memory device.

The display part 20 reads out the physical data stored by the memory part 18 and displays it on a display device or the like. The operator can use the information displayed on the display device as the basis to visually check the physical data of the respective drive shafts of a machine tool, which might cause machining defects of workpieces.

The method of determination of a destination by the destination determining part 16 will be explained. According to one embodiment, the destination determining part 16 successively switches the destinations of the communicating part 12, i.e., the numerical control devices, in accordance with a predetermined measurement order. FIG. 2A and FIG. 2B show exemplary interfaces for setting the measurement order.

FIG. 2A shows the content of the list 1. The list 1 specifies the measurement order in the order of the machines M11 to M15. Therefore, the destination determining part 16 switches the destination of the communicating part 12 in the order of the machine M11, machine M12, machine M13, machine M14, and machine M15 in accordance with this list 1. On the other hand, if the destination is switched in accordance with the list 2, as shown in FIG. 2B, the destination is successively switched in order of the machines M21 to M25. The timing for switching the destination may be set in advance by an operator, for example, such that the destination is switched when a predetermined time elapses, when a certain operating command of the control program is executed, or the like. Upon selection of any of the machines, for example, the "machine M11" by an operator using the interfaces shown of FIG. 2A and FIG. 2B, the type of the physical data to be measured for the selected machine or the drive shafts may also be checked or set as necessary.

According to another embodiment, the destination determining part 16 determines the destination numerical control device of the communicating part 12 in accordance with a predetermined measurement schedule. FIG. 2C and FIG. 2D show exemplary interfaces for setting the measurement schedule. The measurement schedule specifies times at which communication with the respective destination machines are initiated. When the schedule 1 shown in FIG. 2C is selected, the communicating part 12 switches the destination in the order of the machines M11 to M15 every 10 minutes from 3 pm. On the other hand, when the schedule 2 shown in FIG. 2D is selected, the communicating part 12 switches the destination in the order of the machines M21 to M25 every 10 minutes from 4 pm.

The above-described embodiments allow an operator to select the order or the time in which the physical data should be measured by accordingly inputting and editing the measurement order or measurement schedule. For example, when a machining defect occurs in a certain production line, an operator can successively measure the physical data of the machine tools belonging to the production line, in order to identify the machine tool, which causes the defect.

FIG. 3 is a flowchart showing processes performed by the data measuring device 10 according to one embodiment. The flowchart of FIG. 3 relates to the embodiment for measuring data in accordance with the measurement order explained with reference to FIG. 2A and FIG. 2B.

At step S301, the destination determining part 16 determines the measurement order for measuring the physical data. The measurement order is stored in the non-volatile memory of the data measuring device 10. For example, the measurement order is input by an operator using an input device of the data measuring device 10. At step S302, the communicating part 12 switches the destination numerical control device in accordance with the measurement order determined by the destination determining part 16.

At step S303, the physical data measuring part 14 measures the physical data of the drive shaft of the machine tool from the numerical control device, which is the communication destination at a current time.

At step S304, the memory part 18 stores the physical data measured by the physical data measuring part 14. At step S305, the display part 20 displays the physical data stored by the memory part 18 on a display device.

According to the data measuring device according to the present invention, the destination numerical control devices are switched to successively measure the desired physical data. The data measuring device configured as such utilizes the telecommunications lines efficiently, and therefore, can reduce the load on the telecommunications lines. Further, existing facilities can be employed to measure the desired data from a large number of numerical control devices in a reliable manner. Therefore, as compared with the measures by increasing capacity of the telecommunications lines or providing additional storage media, the present system can be reduced in size and cost.

Figure 4:
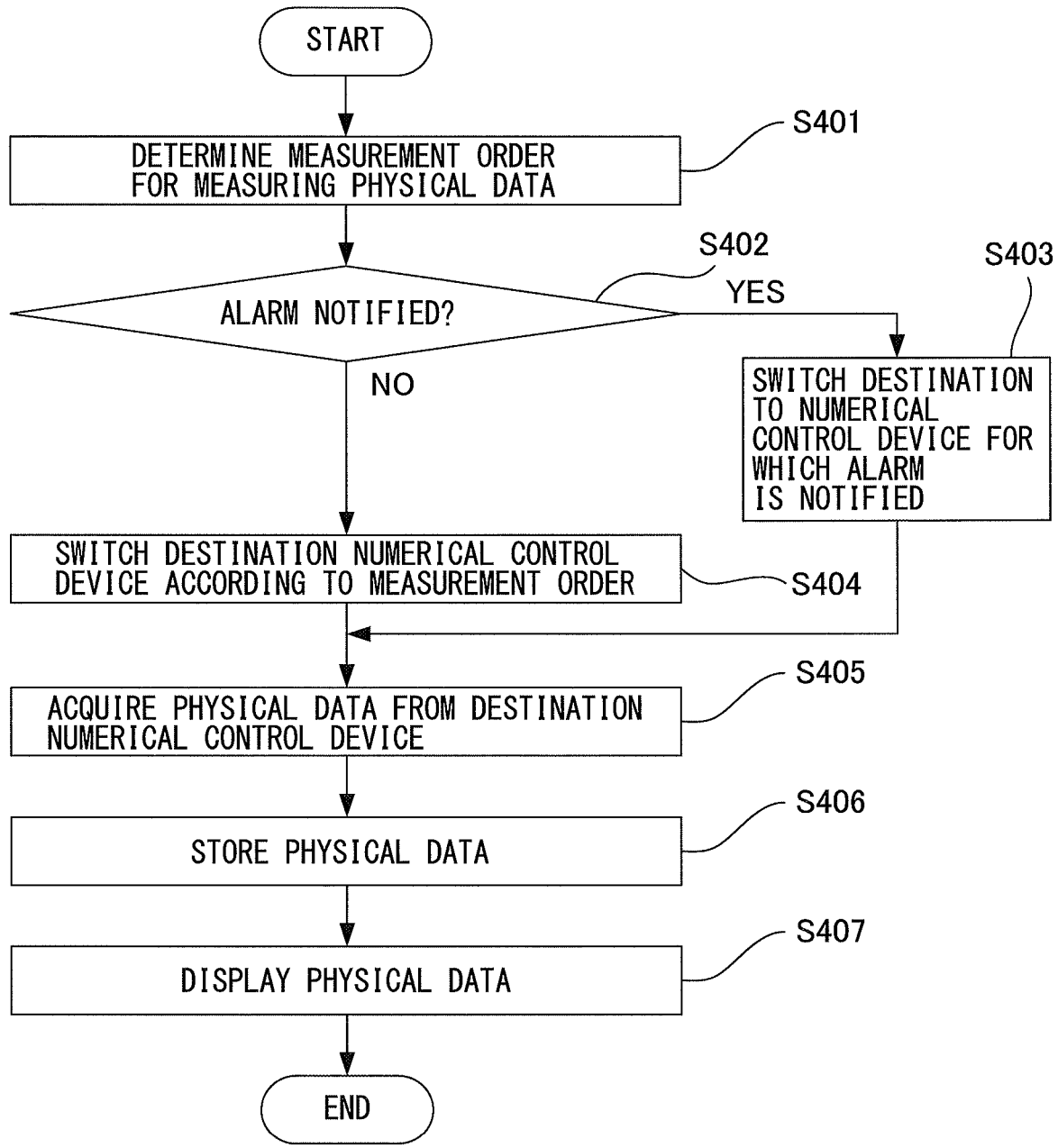
FIG. 4 is a flowchart showing processes performed by a data measuring device according to another embodiment.

According to another embodiment, the data measuring device 10 may be configured to switch the destination numerical control device in response to a certain signal, for example, an alarm notification output from the numerical control device to the host computer 30. FIG. 4 is a flowchart which shows the processes performed by the data measuring device according to such an embodiment.

According to the present invention, at step S402 following step S401 corresponding to step S301 of FIG. 3, it is judged whether or not an alarm has been notified. If no alarm has been notified, the routine proceeds to step S404 where the destination numerical control device is switched in accordance with the measurement order determined at step S401.

On the other hand, if the result of the judgment at step S402 is positive, the routine proceeds to step S403 where the destination is switched to the numerical control device for which the alarm was notified. The processes at steps S405 to S407 are similar to those at steps S303 to S305, and the explanation thereon will be omitted.

According to such an embodiment, the destination numerical control device is switched in response to the alarm notification so as to quickly obtain the physical data of the machine tool malfunctioning. Therefore, the cause of the malfunction can be identified in a short time.

The data measuring device 10 according to the present invention may also be configured to track the machining processes of a specific workpiece and measure a set of physical data or track specific machining processes performed at different production lines and measure the physical data related thereto.

Figure 5:
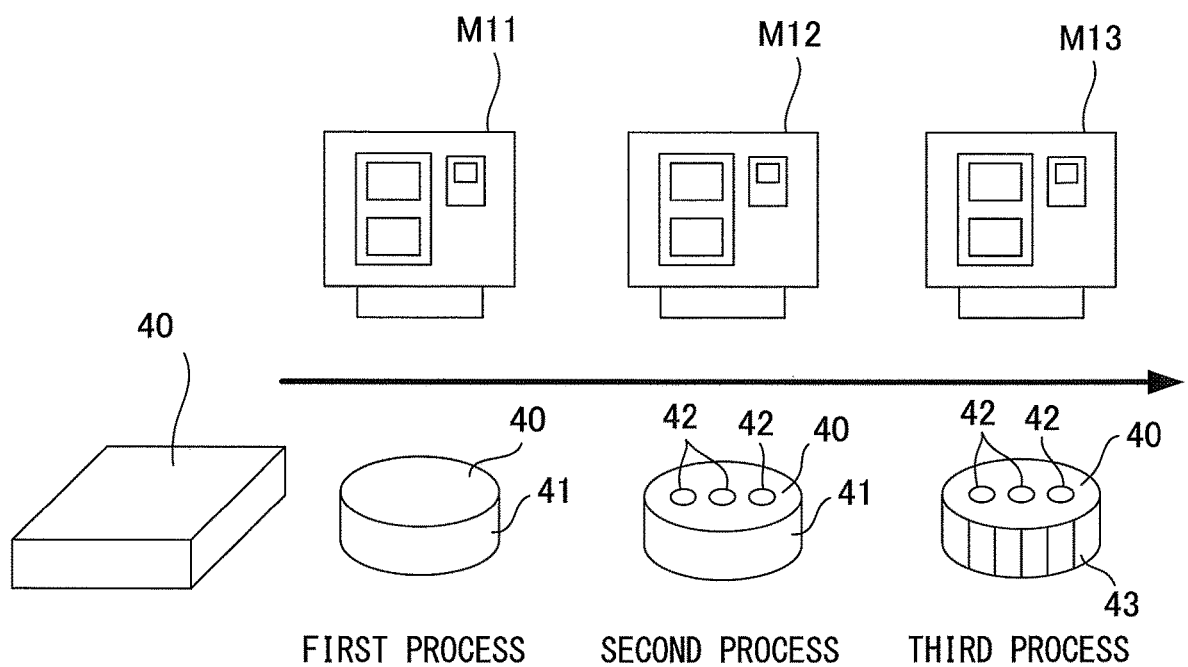
FIG. 5 shows a series of machining processes by way of example.

Referring to FIG. 5, an embodiment for tracking machining processes of a specific workpiece to measure physical data will be explained. FIG. 5 shows machining processes of a workpiece 40. The arrow in the figure indicates the order of the machining processes. Specifically, according to the illustrated example, the processes from the first process on the upstream side of the machining processes to the third process on the downstream side are performed with respect to the workpiece 40.

The first process is a machining process in which a workpiece 40 of rectangular parallelepiped shape is formed into a cylindrical shape with a cylindrical outer circumferential surface 41 by the machine tool M11. The second process is a machining process in which three through holes 42 are formed in the workpiece 40 by the machine tool M12. The third process is a machining process in which a threaded part 43 is formed on the outer circumferential surface 41 of the workpiece 40 by the machine tool M13.

According to the present embodiment, the destination determining part 16 determines the communication destination of the data measuring device 10 in the order of the machine tools M11, M12, and M13 in accordance with the sequence of the machining processes performed on the workpiece 40. That is, the communicating part 12 switches the destination numerical control device in accordance with the progress in the machining processes of the workpiece 40. For example, during the second process for the workpiece 40, the data measuring device 10 acquires physical data from the numerical control device of the machine tool M12. The destination can be switched in response to a start signal which notifies the start of each process and is output by each numerical control device, or in response to an end signal which notifies the end of a process immediately before each process.

Alternatively, when the duration of each process or the starting time of each process is predefined, the destination numerical control device may be switched in accordance with a measurement schedule. According to this embodiment, even if a plurality of workpieces are simultaneously machined in the same production line, any of the workpieces can be tracked to measure desired physical data thereof.

Figure 6:
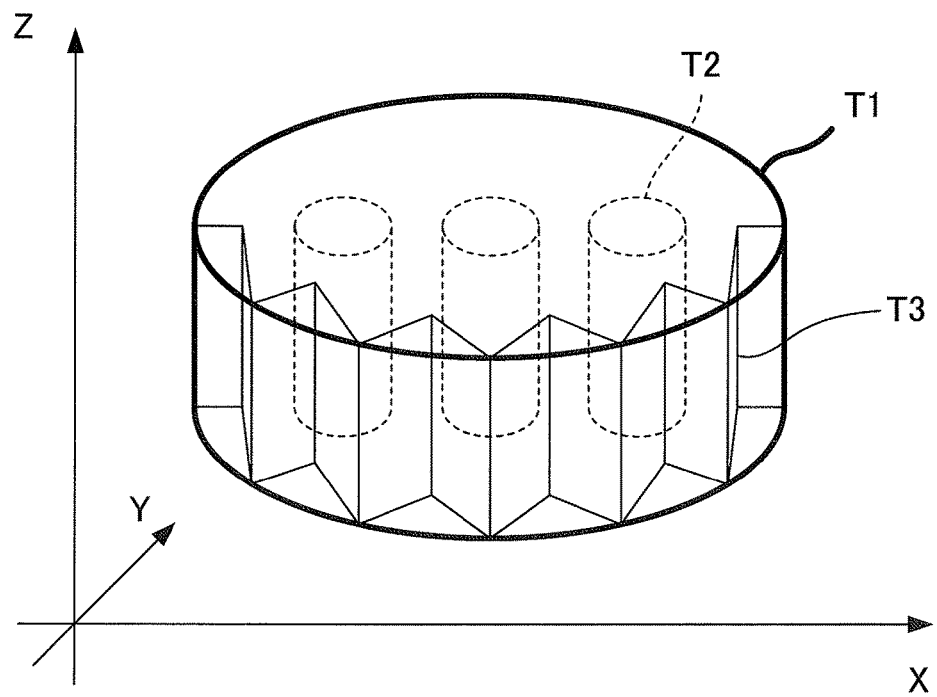
FIG. 6 shows an exemplary display of a path of a tool tip.

The data measuring device 10 may be configured so as to display a three-dimensional path of a tool for each machining process. FIG. 6 is shows an exemplary display of a path of a tool tip which is displayed on the display device of the data measuring device 10. In FIG. 6, the thickened line T1, the dashed line T2, and the thin line T3 respectively show, by way of example, the paths of the tips of the tools when the first process, the second process, and third process shown in FIG. 5 are performed. According to the thus configured data measuring device 10, for example, when a machining defect occurs or the like, the tool path can be displayed in a three-dimensional space as necessary, and therefore an operator can visually check on which machining process causes the defect.

In another embodiment, the data measuring device 10 may also be configured to measure the physical data relating to the same machining processes performed in different production lines independent of each other. FIG. 7 shows the first production line L1 and the second production line L2 performing the machining processes illustrated in FIG. 5. For example, the destination determining part 16 is configured to determine the communication destinations of the data measuring device 10 for measuring the physical data relating to the second process in the first production line L1 and the second process in the second production line L2, respectively.

That is, the communicating part 12 switches the destination to the numerical control device of the machine tool M12 in response to a start signal notifying the start of the second process in the first production line L1. In addition, the destination is switched to the numerical control device of the machine tool M22 in response to a start signal notifying the start of the second process in the second production line. In this way, the destination numerical control device is switched when a particular machining process is performed, and therefore, it is possible to measure the respective physical data relating to the same process performed in production lines different from each other. This facilitates the comparison between the production lines. As described above with reference to FIG. 6, the data measuring device 10 may also be configured to display the paths of the tool tips in order to compare the corresponding processes performed in production lines different from each other.

Effect of the Invention

According to the data measuring device of the present invention, the communicating part successively switches the numerical control device which is connected to the data measuring device in accordance with the determination by the destination determining part. Due to this, the data measuring device measures the physical data of the machine tools, while successively switches the destination numerical control device. Therefore, the number of numerical control devices in communication with the data measuring device at the same time is automatically limited and the amount of data transfer is prevented from excessively increasing. In addition, it is unnecessary to bolster the telecommunications lines and introduce an additional memory device, and therefore, an inexpensive and compact data measuring device can be provided.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

What is claimed is:

1. A data measuring device for measuring data of machining tools, the data measuring device comprising:
   a transceiver for communicating with a plurality of numerical control devices configured to control a plurality of machine tools through telecommunications lines;
   a processor configured to:
      measure, through the numerical control devices in communication with the processor, physical data relating to operations of respective drive shafts of the machine tools corresponding to the numerical control devices;
      successively track, in a predetermined order, machining processes of a particular workpiece by the plurality of machine tools, the predetermined order indicating a predetermined machining sequence of the particular workpiece performed by each of the plurality of machine tools, the successive tracking performed by repeating the following steps for each of the plurality of machine tools:
         in response to the transceiver receiving a trigger signal from at least one numerical control device indicating that the machine tool controlled by the at least one numerical control device has started processing the particular workpiece,
         setting the at least one of the plurality of numerical control devices as a destination,
         in response to setting the at least one of the plurality of numerical control devices as the destination, communicate with the at least one numerical control device through the transceiver, and measure the physical data of the machine tool;
   a memory configured to store the physical data measured by the processor; and
   a display configured to display the physical data stored by the memory,
   wherein the display:
      in response to a first machining process of the respective machining processes being performed, displays a first three-dimensional path of a first machine tool of the plurality of the machine tools, and in response to subsequent machining processes of the respective machining processes being performed, sequentially superimposes and displays subsequent three-dimensional paths of subsequent machine tools of the plurality of the machine tools, wherein each of the three-dimensional paths are displayed in a respective style unique to each of the three-dimensional paths, such that each of the three-dimensional paths can be visually compared to each other and one or more of the respective machining processes can be identified from the visual comparison as causing a defect in the workpiece.

2. The data measuring device according to claim 1, wherein the processor is further configured to in response to a signal which is output from one of the numerical control devices, switch the destination to the one numerical control device which has outputted the signal.

* * * * *